3,273,122
DIGITAL COMPARATOR
Gerald F. Chandler, La Mesa, Calif., assignor to Cohu Electronics, Inc., San Diego, Calif., a corporation of Delaware
Filed Feb. 19, 1964, Ser. No. 346,002
11 Claims. (Cl. 340—146.2)

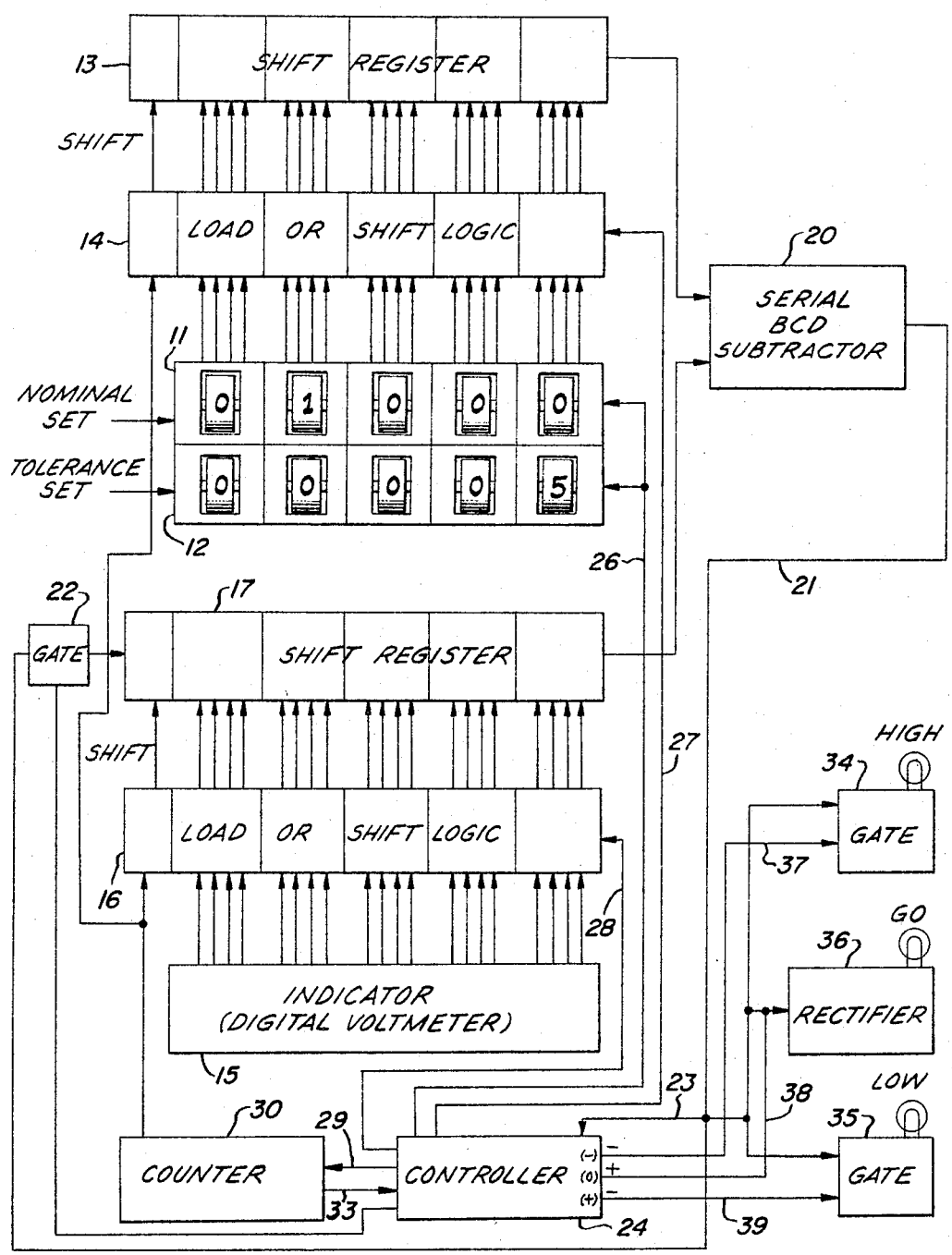

This invention relates to digital comparators and more particularly relates to an electrical system for comparing a test or sampled value with a reference or nominal value.

There are many occasions when it is desirable to compare a numerically expressed value with a reference or nominal value to determine if the test value differs from the reference value by less than a predetermined tolerance. For example, in the manufacturing of precision electrical resistors, it is necessary to test each resistor to determine if its resistance differs from the rated value by less than the acceptable tolerance. Similar testing requirements are present in the manufacture of other electrical components.

It is therefore an object of the present invention to provide an electrical system for quickly and accurately determining if the numerically expressed value of a characteristics of a test object differs from the numerically expressed nominal value of the characteristic by less than a predetermined acceptable tolerance.

It is also an object of the present invention to provide such a system in which these numerically expressed values are subtracted and the difference compared with the predetermined tolerance.

It is another object of the present invention to provide such a system in which the numerical reference or nominal value and the tolerance can be alternately entered into a first storage device, and the numerical test value and the difference can be alternately entered into a second storage device, and the contents of the storage devices compared.

These and other objects and advantages of the present invention will become more apparent upon reference to the accompanying description and drawing, the single figure of which shows a schematic block diagram of the electrical system of the present invention.

For purposes of clarity, the present invention will be described primarily in connection with a system for testing the resistance of resistors. It should be understood, however, that this description is illustrative only, as the present invention is by no means limited to this application. For the sake of illustration, let it be assumed that each resistor is rated to have a nominal value of 1,000 ohms, with a tolerance of plus or minus five ohms, that is, ±.5%.

Turning now to the drawing, the nominal value is set by a first thumb wheel switch 11 having a capacity of five digits, while the tolerance is set in a second similar thumb wheel switch 12. The outputs of the thumb wheel switches 11 and 12 are adapted to be connected to a multi-stage storage device, preferably a shift register 13 by means of conventional load or shift logic 14. The load or shift logic 14 may take the form of a plurality of gates which are gated open to enter the thumb wheel switch information into the shift register 13 when a first control signal is received, and a further gate which is gated open to pass shift pulses to the register 13 when a second control signal is received.

A suitable indicator 15, such as a digital voltmeter, is used to provide a digital signal corresponding to the resistance value of the unit under test. The output of the indicator 15 is connected through load or shift logic 16, similar in construction to load or shift logic 14, to a second storage device, preferably a shift register 17 similar to the register 13. The shift registers 13 and 17 may be provided with as many stages as desired, those illustrated having twenty stages and thus being able to receive and store a five digit binary coded decimal number.

The outputs of the shift registers 13 and 17 are coupled to the inputs of a serial binary coded decimal (BCD) subtractor 20. The output of the subtractor 20 is connected by a line 21 to an input of a gate 22 and to a line 23 which is connected to a controller 24. The controller 24 has a first output connected by a line 25 to the gating input of the gate 22 and is operable to produce a signal at this output which opens the gate 22 so that the output signal of the subtractor 20 appearing on the line 21 can be passed to an input of the shift register 17.

The controller 24 also has an output which is connected by line 26 to the thumb wheel switches 11 and 12. The signal appearing at this output controls the outputs of the thumb wheel switches 11 and 12, for example, by appropriate gating, and determines which number is to be entered into the shift register 13. Another output of the controller 24 is connected to the load or shift logic 14 by the line 27. A signal appearing at this output controls the logic 14 and determines whether it is to enter the thumb wheel information into the register or is to pass shift pulses in it. Another controller output is connected by line 28 to the logic 16 and controls its operation in a similar manner.

The controller 24 also has an output connected by a line 29 to a counter 30 which has a first output connected by a line 31 to the shift gate portion of the logic 16 and by a line 32 to the shift gate portion of the logic 14. This counter serves as the source of shift pulses which act to transfer the numbers stored in registers 13 and 17 to the subtractor 20. The counter 30 has another output connected by a line 33 to an input of the controller 24. This output produces a signal when the counting or shifting has been completed.

The output of the subtractor 20 is also connected to the inputs of first and second gates 34 and 35 and rectifier 36. Each of these devices has a lamp associated with it to indicate when the device has received a predetermined signal or signal combination. The gate 34 has a second input which is connected to an output of a portion of the controller 24 by a line 37. Lines 38 and 39 connect the controller 24 to the rectifier 36 and gate 35 in a similar manner. As indicated, the controller produces an output signal on one of the lines 37, 38 or 39, depending on the nature of the output of the subtractor 20 as applied to the controller 24 by line 23. If the subtractor output is positive, i.e., the nominal value is greater than the test value, the controller produces a negative signal on line 39; if it is negative, the controller produces a negative output signal on line 37; if it is zero, the conroller produces a positive signal on the line 38.

The operation of this system is as follows: The rating or nominal value of the resistors to be tested is manually set on the thumb wheel switch 11 and the acceptable tolerance is set on a thumb wheel switch 12. The resistor is then connected to the indicator 15 so that it produces a binary coded decimal output corresponding to the resistance thereof. The controller 24 is now actuated to produce signals at its various outputs. The first of these outputs appears on the line 26 and actuates the thumb wheel switch 11 or suitable gating associated therewith so that its output rather than that of the thumb wheel switch 12 can be entered in the shift register 13. A second output signal appears on the line 27 and causes the load or shift logic 14 to enable the number set on the thumb wheel switch 11 to be entered or loaded into the shift register 13. A similar signal appears on the line 18 and causes the load or shift logic 16 to enable the number indicated by the digital voltmeter 15 to be entered into the shift register 17.

The system is now set for the subtraction stage. The controller 24 now produces output signals on the lines 27 and 28 causing the shift gate portions of the load or shift logics 14 and 16 to be opened to permit passage of shift pulses from the counter 30 to the shift registers 13 and 17. The production of these pulses is immediately initiated by a signal appearing on the line 29 which starts the counter 30. The outputs of the shift registers 13 and 17 are serially fed to the subtractor 20 which produces a first difference signal and feeds this signal to the gate 22 and to the counter 24 over the line 23. The controller 24 has meanwhile produced an output on the line 25 which opens the gate 22 and permits the first difference signal to be entered into the shift register 17. The controller 24 reacts to the difference signal by producing an output on one of the lines 37, 38 or 39, depending on whether the test value was greater than, equal to, or less than the nominal value.

After the controller receives a signal from the counter 30 indicating the shifting has been completed, it produces output signals on the lines 26 and 27 which cause the tolerance, as set by the thumb wheel 12, to be entered into the shift register 13. The shift gates are again opened and shift pulses again produced so that another subtraction is initiated. The output of the subtractor 20 is now the difference between the tolerance and the original difference or error signal. If the polarity of this output of the subtractor 20 is positive, this indicates that the original difference signal is within the acceptable tolerance. This positive signal is fed to the rectifier 36 and causes the associated "go" lamp to light. This lamp would also be lit if the original or first difference signal was zero, as this would cause the controller 24 to produce a positive output signal on the line 38.

If the polarity of the output of the subtractor 20 is negative, the original difference signal is greater than the tolerance and thus the resistor must be rejected. This negative signal is fed to inputs of the gates 34 and 35. If the original difference signal was positive, a negative signal is applied to the gate 35 by the controller 24. The coincidence of these two negative signals causes the gate 35 to open and the "low" lamp to light. If the original difference signal was negative, a negative signal is applied to the gate 34 by the controller 24. The coincidence of these signals causes the gate 34 to open and the "high" lamp to light. The lamps thus give an indication of the direction in which the tolerance is exceeded, as well as an indication that the resistor must be rejected.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A system for determining if a test numerical value differs from a nominal numerical value by less than a predetermined acceptable tolerance, comprising:
   first storage means;
   means for entering said nominal numerical value into said first storage means;
   second storage means;
   means for entering said test numerical value into said second storage means;
   means coupled to said first and second storage means for subtracting the contents of one of said storage means from the contents of the other of said storage means to produce a difference numerical value;
   means for entering said tolerance into one of said storage means; and
   means for entering said difference numerical value into the other of said storage means;
   said subtracting means again subtracting the contents of one of said storage means from the contents of the other of said storage means to produce a second difference numerical value, the polarity of which indicates whether said test numerical value is within said acceptable tolerance.

2. A system for determining if a test numerical value differs from a nominal numerical value by less than a predetermined acceptable tolerance comprising:
   first storage means;
   means for entering said nominal numerical value into said first storage means;
   second storage means;
   means for entering said test numerical value into said second storage means;
   means coupled to said first and second storage means for subtracting the contents of one of said storage means from the contents of the other of said storage means to produce a difference numerical value;
   means for entering said tolerance into said first storage means; and
   means for entering said difference numerical value into said second storage means;
   said subtracting means again subtracting the contents of one of said storage means from the contents of the other of said storage means to produce a second difference numerical value, the polarity of which indicates whether said test numerical value is within said acceptable tolerance.

3. A system for determining if a test numerical value differs from a nominal numerical value by less than a predetermined acceptable tolerance, comprising:
   first storage means;
   means for entering said nominal numerical value into said first storage means;
   second storage means;
   means for entering said test numerical value into said second storage means;
   means coupled to said first and second storage means for subtracting the contents of one of said storage means from the contents of the other of said storage means to produce a difference numerical value;
   controller means being operable to cause said contents of said storage means to be fed to said subtracting means whereby said difference numerical value is produced;
   means for entering said tolerance into said first storage means; and
   means for entering said difference numerical value into said second storage means;
   said controller means being again operable to cause said contents of said storage means to be fed to said subtracting means whereby a second difference numerical value is produced, the polarity of which indicates whether said test numerical value is within said acceptable tolerance.

4. A system for determining if a test numerical value differs from a nominal numerical value by less than a predetermined acceptable tolerance, comprising:
   first storage means;
   means for entering said nominal numerical value into said first storage means;
   second storage means;
   means for entering said test numerical value into said second storage means;

means coupled to said first and second storage means for subtracting said test numerical value from said nominal numerical value to produce a first difference numerical value;

means for entering said tolerance into said first storage means;

means for entering said first difference numerical value into said second storage means;

said subtracting means subtracting said first difference numerical value from said tolerance to produce a second difference numerical value; and means coupled to said subtractor means and responsive to said second difference numerical value for producing a first indication if said second difference numerical value is of a first polarity and a second indication if said second difference numerical value is of a second polarity.

5. A system for determining if a test numerical value differs from a nominal numerical value by less than a predetermined acceptable tolerance, comprising:

first storage means;

means for entering said nominal numerical value into said first storage means;

second storage means;

means for entering said test numerical value into said second storage means;

means coupled to said first and second storage means for subtracting said test numerical value from said nominal numerical value to produce a first difference numerical value;

means coupled to said subtractor means for producing an output signal indicative of the polarity of said first difference numerical value;

means for entering said tolerance into said first storage means;

means for entering said first difference numerical value into said second storage means;

said subtracting means subtracting said first difference numerical value from said tolerance to produce a difference numerical value; and means coupled to said subtractor means and to said output signal producing means and responsive to said output signal and the polarity of said second difference numerical value for producing a first indication if said test numerical value is less than said nominal numerical value by more than said tolerance, a second indication if said test numerical value differs from said nominal numerical value by less than said tolerance, and a third indication if said test numerical value is greater than said nominal numerical value by more than said tolerance.

6. An electrical system for determining if a test numerical value differs from a nominal numerical value by less than a predetermined acceptable tolerance, comprising:

a first shift register;

means for setting said nominal numerical value;

means for setting said tolerance;

first logic means coupled to said first shift register for causing said nominal numerical value or said tolerance to be entered into or shifted out of said first shift register;

a second shift register;

means for establishing said test numerical value;

second logic means coupled to said second shift register for causing said test numerical value to be entered into or shifted out of said second shift register;

a subtractor coupled to said shift registers for subtracting the contents of one of said shift registers from the contents of the other of said shift registers when said contents are shifted out of said shift registers to produce a first difference numerical value;

means for entering said first difference numerical value into said second shift register;

said first and second logic means causing said nominal numerical value and said test numerical value to be entered into and then shifted out of said first and second shift registers respectively, whereby said first difference numerical value is produced; said first logic means then causing said tolerance to be entered into and shifted out of said first shift register, said entering means and said second logic means simultaneously causing said first difference numerical value to be entered into and shifted out of said second shift register whereby a second difference numerical value is produced; and means coupled to said subtractor and responsive to the polarity of said second difference numerical value for indicating whether said test numerical value differs from said nominal numerical value by less than said tolerance.

7. An electrical system for determining if a test numerical value differs from a nominal numerical value by less than a predetermined acceptable tolerance, comprising:

a first shift register;

means for setting said nominal numerical value;

means for setting said tolerance;

first logic means coupled to said first shift register for causing said nominal numerical value or said tolerance to be entered into or shifted out of said first shift register;

a second shift register;

means for establishing said test numerical value;

second logic means coupled to said second shift register for causing said test numerical value to be entered into or shifted out of said second shift register;

a subtractor coupled to said shift registers for subtracting the contents of one of said shift registers from the contents of the other of said shift registers when said contents are shifted out of said shift registers to produce a first difference numerical value;

means coupled to said subtractor for producing an output signal indicative of the polarity of said first difference numerical value; and means for entering said first difference numerical value into said second shift register;

said first and second logic means causing said nominal numerical value and said test numerical value to be entered into and then shifted out of said first and second shift registers respectively, whereby said first difference numerical value is produced;

said first logic means then causing said tolerance to be entered into and shifted out of said first shift register, said entering means and said second logic means simultaneously causing said first difference numerical value to be entered into and shifted out of said second shift register whereby a second difference numerical value is produced; and means coupled to said subtractor and to said output signal producing means and responsive to said output signal and the polarity of said second difference numerical value for producing a first indication if said test numerical value is less than said nominal numerical value by more than said tolerance, a second indication if said test numerical value differs from said nominal numerical value by less than said tolerance, and a third indication if said test numerical value is greater than said nominal numerical value by more than said tolerance.

8. A system for determining if a test numerical value differs from a nominal numerical value by less than a predetermined acceptable tolerance, comprising:

first storage means;

first means operable to produce an output corresponding to said nominal numerical value;

second means operable to produce an output corresponding to said tolerance;

means coupling said first storage means to said first and second operable means and operable to permit the output of said first or second operable means to be entered into said first storage means; second storage means;

third means operable to produce an output corresponding to said test numerical value;

means coupling said second storage means to said third operable means and operable to permit the output of said third operable means to be entered into said second storage means;

means coupled to said first and second storage means for subtracting the numerical value stored in said differs from a nominal numerical value by less than a second storage means from the numerical value stored in said first storage means to produce a difference numerical value;

gate means coupled to said subtracting means and to said second storage means and operable to enter said difference numerical value into said second storage means;

pulse producing means coupled to said first and second storage means and operable to cause said storage means to feed the numerical values stored therein to said subtracting means;

means coupled to said subtracting means and operable to indicate the polarity of said difference numerical value; and controller means for sequentially causing said first and third operable means to be rendered operable whereby said nominal and test numerical values are entered into said first and second storage means, causing said pulse producing means to be rendered operable whereby said difference numerical value is produced by said subtracting means, causing said second operable means to be rendered operable whereby said tolerance is entered into said first storage means and rendering said gate means operable whereby said difference numerical value is entered into said second storage means, causing said pulse producing means again to be rendered operable whereby a second difference numerical value is produced, and causing said indicating means to be rendered operable to indicate the polarity of said second difference numerical value.

9. An electrical system for determining if a test numerical value differs from a nominal numerical value by less than a predetermined acceptable tolerance comprising:

a first shift register;

first means for setting said nominal numerical value and producing an output corresponding thereto;

second means for setting said tolerance and producing an output corresponding thereto;

first logic means coupled to said first shift register and said first and second setting means and operable in response to a first signal to enter said nominal numerical value into said first shift register; in response to a second signal to enter said tolerance into said first shift register, and in response to a third signal to shift out the contents of said first shift register;

a second shift register;

third means for producing an output corresponding to said test numerical value;

second logic means coupled to said second shift register and said third means and operable in response to a fourth signal to enter said test numerical value into said second shift register and in response to a fifth input signal to shift out the contents of said second shift register;

a subtractor coupled to said first and second shift registers for subtracting the contents of said second shift register from the contents of said first shift register to produce a difference numerical value;

gate means coupled to said subtractor and operable in response to a sixth signal to enter said difference numerical value into said second shift register;

means coupled to said subtractor for indicating the polarity of a difference numerical value produced by said subtractor; and controller means having outputs coupled to said first logic means, said second logic means and said gate means, said controller sequentially producing said first and fourth signals whereby said nominal numerical value and said test numerical value are entered into said first and second shift registers, said third and fifth signals whereby said contents of said registers are shifted out of said registers causing said subtractor to produce a first difference numerical value, said second and sixth signals whereby said tolerance is entered into said first shift register and said difference numerical value is entered into said first and second shift registers, and again said first and fourth signals whereby said contents of said registers again are shifted out of said registers causing said subtractor to produce a second difference numerical value, said indicating means indicating the polarity of said second difference numerical value.

10. An electrical system for determining if a test numerical value differs from a nominal numerical value by less than a predetermined acceptable tolerance, comprising:

a first shift register;

first means for setting said nominal numerical value and producing an output corresponding thereto;

second means for setting said tolerance and producing an output corresponding thereto;

first logic means coupled to said first shift register and said first and second setting means and operable in response to a first signal to enter said nominal numerical value into said first shift register, in response to a second signal to enter said tolerance into said first shift register, and in response to a third signal to shift out the contents of said first shift register;

a second shift register;

third means for producing an output corresponding to said test numerical value;

second logic means coupled to said second shift register and said third means and operable in response to a fourth signal to enter said test numerical value into said second shift register and in response to a fifth input signal to shift out the contents of said second shift register;

a subtractor coupled to said first and second shift registers for subtracting the contents of said second shift register from the contents of said first shift register to produce a first difference numerical value;

means coupled to said subtractor for producing an output signal indicative of the polarity of said first difference numerical value;

gate means coupled to said subtractor and operable in response to a sixth signal to enter said first difference numerical value into said second shift register;

controller means having outputs coupled to said first logic means, said second logic means and said gate means, said controller sequentially producing said first and fourth signals whereby said nominal numerical value and said test numerical value are entered into said first and second shift registers, said third and fifth signals whereby said contents of said registers are shifted out of said registers causing said subtractor to produce said first difference signal, said second and sixth signals whereby said tolerance is entered into said first shift register and said first difference numerical value is entered into said first and second shift registers, and again said first and fourth signals whereby said contents of said registers again are shifted out of said registers causing said subtractor to produce a second difference numerical value;

means coupled to said subtractor and to said output signal producing means and responsive to said output signal and the polarity of said second difference numerical value for producing a first indication if said test numerical value is less than said nominal numerical value by more than said tolerance, a second indication if said test numerical value differs from said nominal numerical value by less than said tolerance, and a third indication if said test numerical value is greater than said nominal numerical value by more than said tolerance.

11. The system of claim 9 wherein said first and second means are thumb wheel switches and said third means is a digital voltmeter.

No references cited.

MALCOLM A. MORRISON, *Primary Examiner.*

I. FAIBISCH, *Assistant Examiner.*